United States Patent [19]

Ishigami et al.

[11] Patent Number: 4,655,501
[45] Date of Patent: Apr. 7, 1987

[54] ARMREST OF A SEAT

[75] Inventors: Yukio Ishigami, Kawasaki; Yoshinori Akiyama; Haruhumi Terasawa, both of Yokohama, all of Japan

[73] Assignees: NHK Spring Co., Ltd.; Ikeda Bussan Co. Ltd., both of Yokohama, Japan; a part interest

[21] Appl. No.: 758,754

[22] Filed: Jul. 25, 1985

[51] Int. Cl.⁴ ................................................ A47C 7/54
[52] U.S. Cl. ........................................ 297/113; 16/325; 16/333; 297/115; 297/417
[58] Field of Search ............... 297/113, 115, 356, 411, 297/417; 403/92, 93; 16/325, 333, 347, 349

[56] References Cited

U.S. PATENT DOCUMENTS

| | | | |
|---|---|---|---|
| 3,186,253 | 6/1965 | Ramillon | 297/356 X |
| 3,232,136 | 2/1966 | Bahmuller | 403/93 X |
| 3,304,107 | 2/1967 | Bahmuller | 403/93 |
| 3,352,580 | 11/1967 | Kurz et al. | 16/325 X |
| 3,643,292 | 2/1972 | Mayer | 16/325 |
| 4,035,866 | 7/1977 | Pickles | 16/325 |
| 4,370,898 | 2/1933 | Maruyama | 297/408 X |
| 4,435,011 | 3/1984 | Hakamata | 297/113 |

Primary Examiner—Kenneth J. Dorner
Assistant Examiner—Peter R. Brown
Attorney, Agent, or Firm—Fleit, Jacobson, Cohn & Price

[57] ABSTRACT

This invention includes an armrest having a combination of a ratchet mechanism with a cam for locking the armrest in an arbitrary inclined state. Three supporting shafts are secured to an armrest frame. A ratchet wheel of semicircular shape includes gear teeth. A first cam is integrally fixed to a circumferential portion of a bracket in which the first supporting shaft is inserted. A second supporting shaft is secured to the armrest frame. A pawl and a second cam are integrally secured to each other. The second cam and the pawl are rotated integrally around the second supporting shaft. The third supporting shaft is fixed to the armrest frame between the first supporting shaft and the second supporting shaft. A third cam is pivotally secured to the third rotatably supporting shaft.

7 Claims, 10 Drawing Figures

ARMREST OF A SEAT

BACKGROUND OF THE INVENTION

This invention relates to an armrest of a seat attached to a seat back pivotally installed in an automobile and the like.

When the rear seat of an automobile or the like is a bench type seat, at the intermediate portion of a seat back adapted to support a person's back, an armrest is housed so as to be able to be taken in and out therefrom.

Heretofore, the armrest is not only impossible to control a degree of angle, but also impossible to lock at a position to house or to use.

SUMMARY DESCRIPTION OF THE INVENTION

This invention provides an armrest possible to control the degree of angle of the armrest together with enabling the locking thereof at the time of housing and using of the seat back by the combination of a ratchet mechanism with a cam.

DETAILED DESCRIPTION OF THE INVENTION

Figure 1:
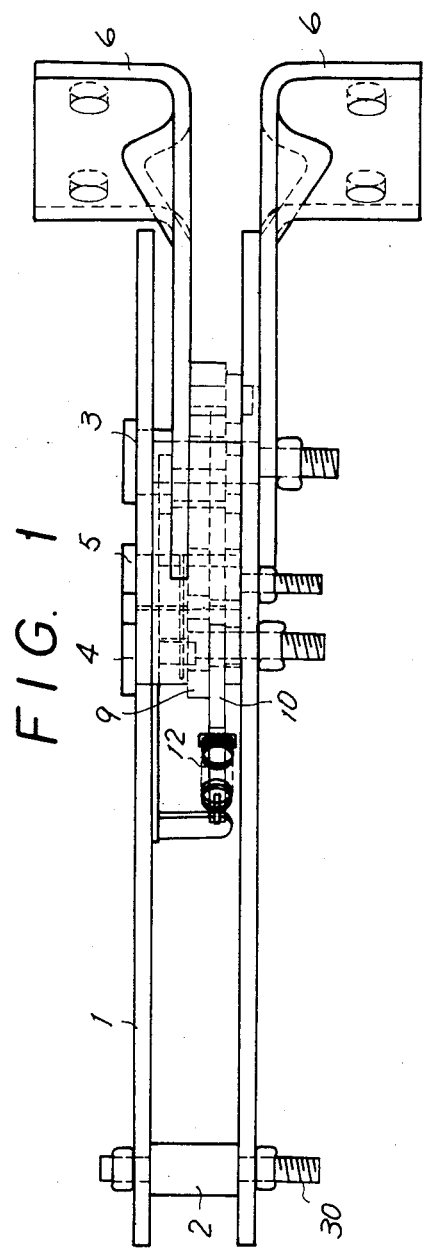
FIG. 1 is a plan view which shows a most preferable embodiment of this invention.
Figure 2:
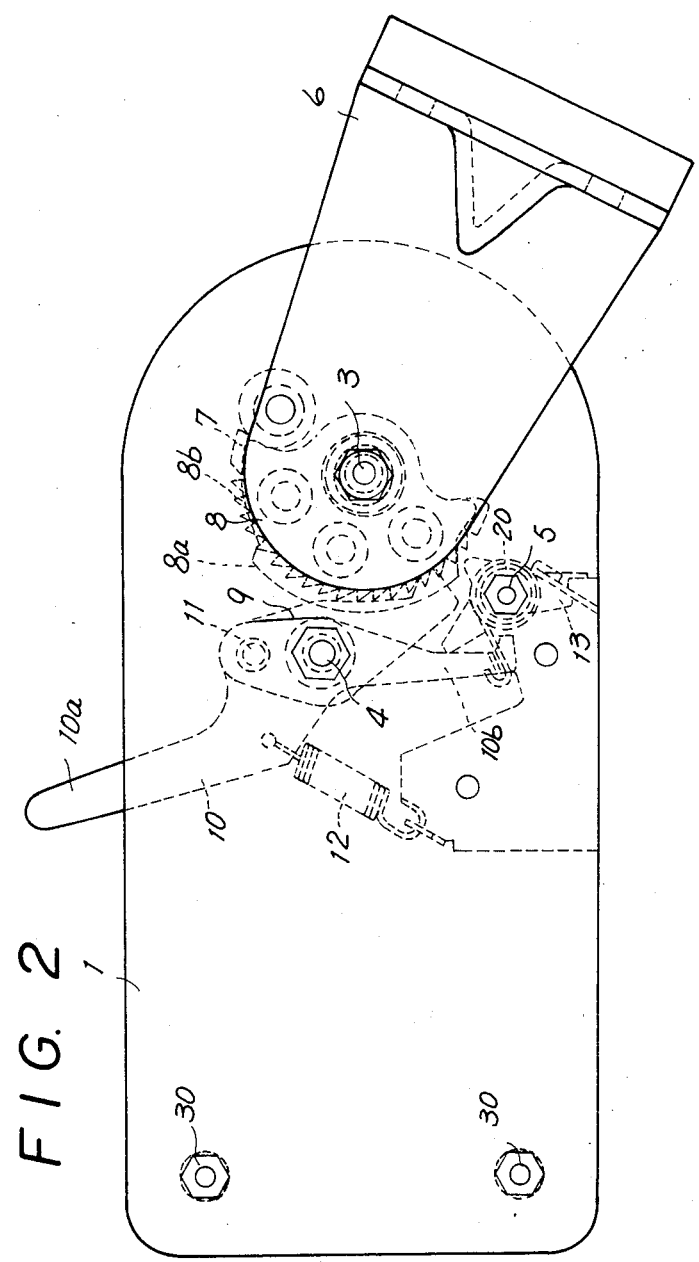
FIG. 2 is a side view which shows an embodiment of this invention.

First, an embodiment of this invention shown in FIG. 1 and FIG. 2 will be described as follows.

Each drawing represents a state wherein a cover of armrest is removed. A frame 1 of the armrest which forms a skelton of the armrest consists of 2 sheets secured in parallel to a spacer 2 and a bolt 30 screwed with said spacer 2 holding a fixed spacer at the left end portion thereof.

Further, three pivotal supporting shafts 3, 4 and 5 are secured to the armrest frame therein. A first supporting shaft 3 thereof is positioned at the most right end of the armrest 1, the frame side of the seat back, and axially supports said armrest frame 1 to said seat back frame (not shown in figure) by being adapted to be inserted into said brackets 6, 6 fixed at the side of a seat back frame. A ratchet wheel 7 of semicircular disc having inclined gear teeth and a first cam 8 are integrally fixed to the circumferential portion of said bracket 6 wherein the first supporting shaft is inserted therethrough. In this case, said first cam 8 consists of a semicircular disc which continuously connects a large diameter portion 8a with a small diameter portion 8b, said large diameter portion 8a being adapted to rotate a third cam described hereafter by contacting with said third cam by the rotation thereof.

Further, while the second pivotal supporting shaft 4 is positioned to the left side of the first rotatably supporting shaft 3, a pawl 9 which engages with the gear wheel portion of said ratchet wheel 7 at the top end portion thereof and a second cam 10 are integrally secured each other. Said second cam 10 and said pawl 9 are connected to the second pivotal supporting shaft 4 and connected by a pin 11, whereby the second cam 10 and the pawl 9 are adapted to rotate integrally around the second rotatably supporting shaft 4. In this case, the second cam 10 is bent in an S-shape to protrude to the upper portion of the armrest frame 1 forming the one end portion 10a of the lever which serves to operate the lever, and at the side of said lever portion one end of a return spring 12 is connected, the other end of which is connected to the armrest frame 1, whereby said cam 10 is adapted to bias the pawl 9 in the engaging direction with the ratchet wheel 7 by the return spring 12. Further, the third pivotal supporting shaft 5 is fixedly positioned between the first rotatably supporting shaft 3 and the second one 4, and a third cam 13 is pivotally secured thereto. The third cam 13 is forked into two branches at the end portion thereof so that said cam 13 may be latched with a large diameter portion 8a of said first cam 8 and another end portion 10b of said second cam 10, and allowed to rotate said cam 10 by striking against said another end portion 10b of said second cam 10 after contacting with the large diameter portion 8a of said first cam 8, thereby being adapted to rotate said pawl 9 which operates integrally with said cam 10 in the disengaging direction.

Thus, the third cam 13 is pivotally biased to the side of the first cam 8 with the aid of torsion spring 20 together with being adapted to rotate between two distinct positions by movement of the first cam 8 and the second one 10 taking the third pivotal supporting shaft 5 as a center.

Figure 3:
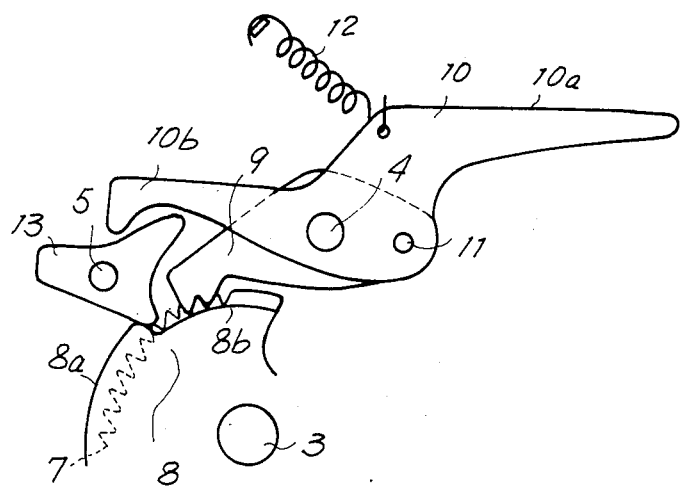
FIGS. 3, 4, 5 and 6 are side views of material portions which show actions according to this invention respectively.
Figure 7:
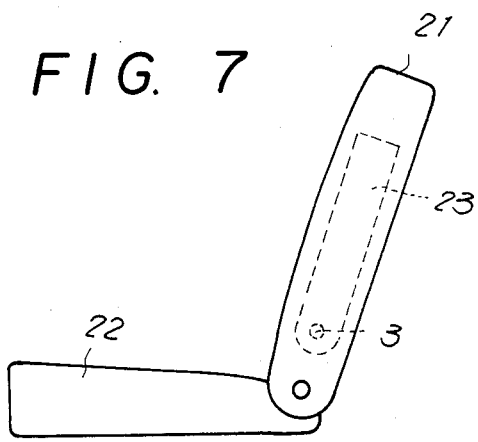
FIG. 7 to FIG. 10 are side views which represent the actions of armrest, said figures corresponding to FIGS. 3, 4, 5 and 6 respectively.
Figure 4:
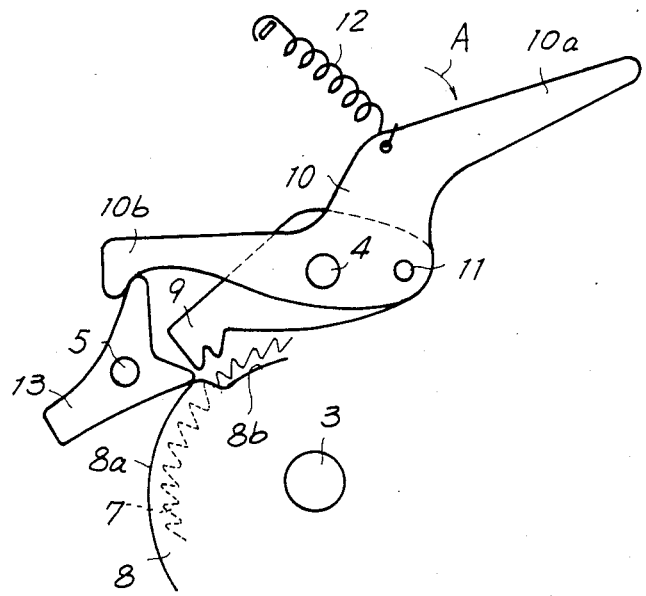
Figure 8:
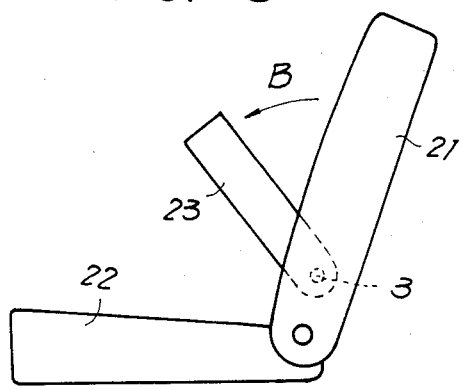
Figure 5:
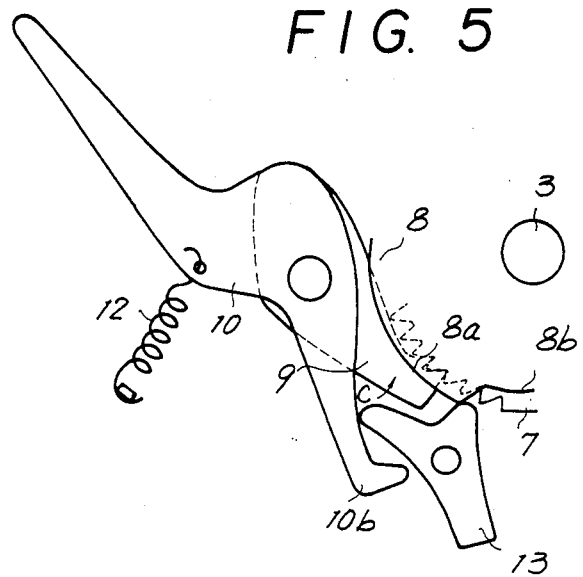
Figure 9:
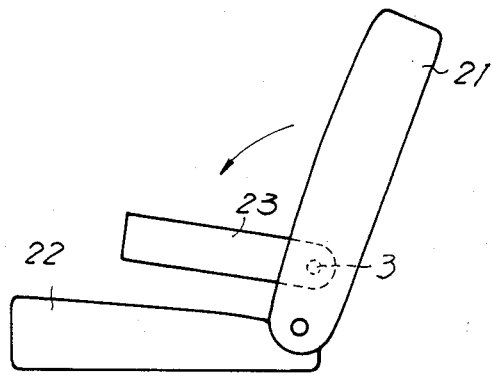
Figure 6:
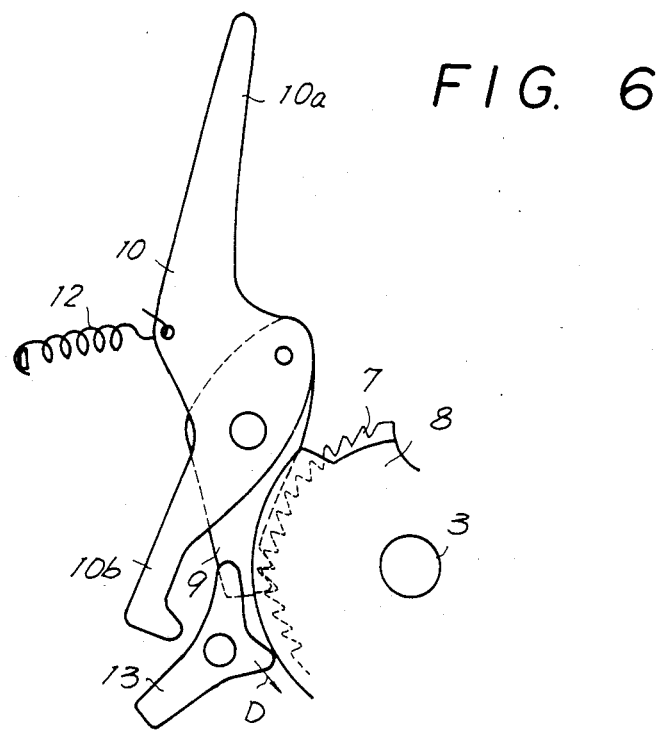
Figure 10:
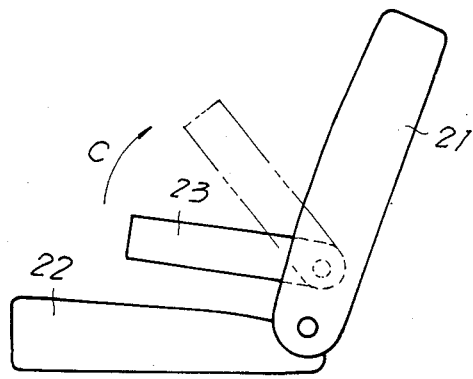

Then, the actions of the above devices will be described according to FIG. 3 to FIG. 10. The FIG. 3 and FIG. 7 denote states wherein the armrest is housed in the seat back. In FIG. 7, the numeral 21 is a seat back disposed in upright at the rear side of a seat cushion 22 and the armrest 23 is positioned in parallel to the seat back 21. In this state, as shown in FIG. 3, the second cam 10 and pawl 9 rotate toward ratchet teeth 7 side by bias of the return spring 12, thereby engaging the pawl 9 with the ratchet wheel to lock the rotation of the armrest frame 1 downward. At this time, the third cam 13 is positioned at the side of the small diameter portion 8b of the first cam 8 as shown in figure, said third cam 13 being latched with neither of the first cam 8 nor the second cam 10. In order to draw out the armrest 23 in a lower direction from the seat back 21 by rotating it from this state, this is performed by rotating the lever portion 10a of the second cam 10 in a direction shown by arrow A in FIG. 4. By this rotation, the second cam 10 and the pawl 9 rotate in the disengaging direction against the return spring 12 to remove the engagement of the pawl 9 with ratchet 7, thereby removing the lock. Accordingly, the rotation of armrest 23 in a direction shown by arrow B in FIG. 8, becomes possible. In the initial step of this rotation, in order to rotate the third cam 13 by striking the third cam 13 against the large portion 8a of the first cam 8, said third cam 13 strikes against the another end portion 10b of the second cam 12, thereby causing the rotation of said cam 10 in the disengaging direction to maintain the disengagement of the pawl 9 from ratchet wheel 8. This disengaging state continues during the large diameter portion 8a of the first cam 8 striking against the third cam 13. When the striking of the large diameter portion 8a against the third cam 13 is over due to the rotation of the armrest 1, the latch of the first cam 8 with the third cam 13 is disengaged by the rotation of the third cam 13 in the pressurized direction of the torsion spring 20 as shown in FIG. 5 into abutment with the smaller diameter portion 8b. Then, the second cam 10 and the pawl 9 rotate and return in the engaging direction by being biased by return spring 12 and the pawl 9 is engaged with ratchet 7 again. In this state, the armrest 23 is, as shown in FIG. 9, horizontally, protruded from the side of the seat back 21 to be fixed to a position used and is locked without rotating in the lower direction. Further, a whole view of the armrest at the position used is shown in FIG. 2. Then, the control of angle of the armrest 23 from this state is performed by rotating the armrest 23 in the upper direction shown by an arrow C in FIG. 10. Since this rotative direction is direction wherein the third cam 13 does not latch with the second cam 10 as shown by an arrow D in FIG. 6, and the teeth shape provided to the ratchet wheel 7 are adapted to be inclined against the rotation of the armrest frame 1 in the upper direction so as to be unlocked. Accordingly, the armrest frame 1 can be rotated toward the upper direction even if the pawl 9 is engaged with ratchet wheel 7 by being biased by dint of return spring 12. Thus, if the rotation of the armrest is stopped at an arbitrary angle, the rotation of the armrest in the lower direction is locked at the position thereof. Further, if the rotation of the armrest in the upper direction is continued, said rotation is continued to a housing position where the locking is performed. Thus if the rotation of the armrest is stopped at an arbitrary angle, the rotation of the armrest toward the lower direction is locked at this position. Therefore, according to this embodiment, the lock of the armrest is performed not only at the position used and the housed position, but also in an unlocking direction of rotation to a position of use where the rotation in the upper direction becomes an unlocked state. Accordingly, a preferable angle can be obtained only by rotation.

Further, in this invention, the first cam and the ratchet wheel may be integrally formed with the second cam and the ratchet wheel without forming a separate body. Still further, a torsion spring, air cylinder or the like may be used in place of a coil spring as said return spring. The same effect as the above embodiment can be obtained even in these cases.

In accordance with this invention as described above, the armrest having a seat capable of being allowed to incline at an arbitrary angle together with being capable of locking at the housing position and the position used, can be provided.

We claim:

1. A seat assembly including an armrest, a backrest and an armrest device for adjusting an angle of the armrest relative to the backrest, said armrest device comprising:

pivot means for pivotally mounting the armrest to the backrest so that the armrest is movable between an upper position and a lower position;
   first cam means mounted on the backrest;
   ratchet means mounted on the backrest;
   pawl means movably mounted on the armrest and urged into engagement with the ratchet means;
   operating means interconnected with said pawl means and operable so as to disengage the pawl means from the ratchet means;
   second cam means rotatably mounted on the armrest;
   connecting means for connecting the second cam means to the pawl means;
   said ratchet means acting in engagement with the pawl means to lock the armrest against movement in a first direction from the upper position to the lower position and to allow the armrest to move in a second direction opposite to the first direction;
   third cam means having a first cam portion and a second cam portion, said third cam means being rotatably mounted on the armrest and arranged to rotate between a first position and a second position and urged into engagement with the first cam means through disengagement of said pawl means and said ratchet means and pivoting of the armrest, said third cam means engaging the second cam means to maintain the disengagement of the pawl means from the ratchet means;
   said first cam means keeping the third cam means disengaged from the second cam means when the armrest is located in each of the upper and lower positions engaging the pawl means with the ratchet means;
   in said first position, said first cam means enabling the first cam portion of the third cam means to engage the second cam means when the armrest is initiated to move in said first direction from the upper position to maintain the disengagement of the pawl means from the ratchet means until the armrest reaches the lower position wherein the second cam portion of the third cam is disengaged from the first cam, thereby rotating the first cam portion of the third cam to the second position out of engagement with the second cam and allowing pawl to engage the ratchet so that when the armrest is initiated to move in said second direction from the lower position, the second cam portion of the third cam, in the second position, reengages the first cam thereby allowing the pawl means to remain engaged with the ratchet means,
   whereby the armrest is releasably locked in each of different positions of angular inclination.

2. A seat assembly including an armrest, a backrest and an armrest device for adjusting an angle of the armrest relative to the backrest, said armrest device comprising:

first shaft means for pivotally mounting the armrest at one end of the armrest to the backrest so that the armrest is movable between an upper position and a lower position;
   a first cam fixed to the backrest, said first cam having a pair of first cam surfaces which are spaced from each other and a second cam surface which is formed between said pair of first cam surfaces;
   a ratchet wheel fixed to the backrest;
   second shaft means mounted on the armrest;
   a pawl movably mounted on the second shaft means;
   first spring means for biasing said pawl into engagement with said ratchet wheel;
   an operating lever movably mounted on the second shaft means and manually operable so as to disengage the pawl from the ratchet wheel against said first spring means;
   a second cam movably mounted on the second shaft means;
   connecting means for rigidly connecting the second cam to said pawl;
   said ratchet wheel acting in engagement with the pawl to lock the armrest against movement in a first direction from the upper position to the lower position and to allow the armrest to move in a second direction opposite to the first direction;

third shaft means mounted on the armrest at a distance from said second shaft means;

a third cam rotatably mounted on the third shaft means and having first and second cam portions and said third cam being arranged to rotate between a first position and a second position, wherein, when the armrest is moved in said first direction, said first cam portion engages with said second cam thereby maintaining the disengagement of the pawl from the ratchet wheel;

second spring means for biasing said second cam portion of the third cam into engagement with the first cam;

said second cam portion of the third cam being engaged respectively with the first and second cam surfaces of the first cam by said second spring means when the armrest is located respectively in the upper and lower positions thereby allowing the pawl to engage with the ratchet wheel;

in said first position, said second cam portion of the third cam becoming engaged with the second cam surface of the first cam so as to engage the first cam portion of the third cam with the second cam when the armrest is initiated to move in the first direction from the upper position thereby maintaining the disengagement of the pawl from the ratchet wheel until the armrest reaches the lower position, wherein the second cam portion of the third cam engages the first cam surface of the first cam, thereby rotating the first cam portion of the third cam to the second position out of engagement with the second cam and allowing the pawl to engage the ratchet and in said second position, said second cam portion of the third cam becoming engaged with the second cam surface of the first cam to thereby maintain disengagement of said third cam from said second cam when the armrest is initiated to move in the second direction from the lower position thereby allowing the pawl to remain engaged with the ratchet wheel, whereby the armrest is releasably locked in each of different positions of angular inclination.

3. The armrest device according to claim 2, wherein said second cam is formed integrally with said operating lever.

4. The armrest device according to claim 2, wherein said armrest is housed in the upper position and is extended substantially horizontally in said lower position.

5. The armrest device according to claim 2, wherein said first cam and the ratchet wheel are aligned side by side on the first shaft means, and said pawl and the second cam are aligned side by side on the second shaft means.

6. The armrest device according to claim 2, wherein said paired first cam surfaces are disposed along a first circle having a first radius extending from said first shaft means; said second cam surface is disposed along a second circle with a second radius extending from said first shaft means; said second radius is larger than the first radius; said ratchet teeth is provided with a plurality of teeth along a periphery of the wheel which have a third radius from said first shaft means; and the length of said third radius is between the lengths of said first and second radiuses.

7. The armrest device according to claim 6, wherein said teeth of the ratchet wheel are of an inclined shape so that said pawl is allowed to slide over the teeth of the ratchet wheel when the armrest moves in said second direction.

* * * * *